US009055188B2

(12) United States Patent
Hojer

(10) Patent No.: US 9,055,188 B2
(45) Date of Patent: Jun. 9, 2015

(54) SCREEN CAMERA

(71) Applicant: Henrik Hojer, Sodra Sandby (SE)

(72) Inventor: Henrik Hojer, Sodra Sandby (SE)

(73) Assignees: Sony Corporation, Tokyo (JP); Sony Mobile Communication AB, Lund (SE)

( * ) Notice: Subject to any disclaimer, the term of this patent is extended or adjusted under 35 U.S.C. 154(b) by 68 days.

(21) Appl. No.: 13/871,196

(22) Filed: Apr. 26, 2013

(65) Prior Publication Data

US 2013/0286152 A1  Oct. 31, 2013

Related U.S. Application Data

(60) Provisional application No. 61/638,621, filed on Apr. 26, 2012.

(30) Foreign Application Priority Data

Apr. 26, 2012  (EP) ..................... 12165700

(51) Int. Cl.
*H04N 7/14* (2006.01)
(52) U.S. Cl.
CPC ..................... *H04N 7/144* (2013.01)
(58) Field of Classification Search
USPC ............. 345/82–87; 349/1; 348/14.08–14.09, 348/14.01, 14.02, 14.14, 14.15, 14.16, 348/14.12
See application file for complete search history.

(56) References Cited

U.S. PATENT DOCUMENTS

| 8,125,510 | B2 * | 2/2012 | Agarwal et al. | 348/14.08 |
| 8,340,365 | B2 * | 12/2012 | Thorn et al. | 382/118 |
| 2008/0106629 | A1 * | 5/2008 | Kurtz et al. | 348/333.01 |
| 2009/0009628 | A1 | 1/2009 | Janicek | |
| 2009/0102763 | A1 * | 4/2009 | Border et al. | 345/87 |
| 2010/0302343 | A1 * | 12/2010 | Bolle | 348/14.08 |
| 2011/0149012 | A1 * | 6/2011 | Bolle et al. | 348/14.08 |
| 2011/0285881 | A1 | 11/2011 | Izuha et al. | |
| 2012/0083908 | A1 * | 4/2012 | Carpenter et al. | 700/91 |
| 2012/0092440 | A1 | 4/2012 | Cho et al. | |
| 2012/0188367 | A1 * | 7/2012 | Marcu | 348/135 |
| 2012/0200495 | A1 * | 8/2012 | Johansson | 345/156 |
| 2012/0235884 | A1 * | 9/2012 | Miller et al. | 345/8 |
| 2012/0307123 | A1 * | 12/2012 | Cok et al. | 348/333.01 |
| 2012/0313867 | A1 * | 12/2012 | Luo et al. | 345/173 |
| 2012/0327101 | A1 * | 12/2012 | Blixt et al. | 345/589 |
| 2013/0263017 | A1 * | 10/2013 | Moyers et al. | 715/753 |
| 2014/0168037 | A1 * | 6/2014 | Sakariya et al. | 345/82 |

FOREIGN PATENT DOCUMENTS

EP  2 383 995 A2  11/2011

* cited by examiner

*Primary Examiner* — Olisa Anwah
(74) *Attorney, Agent, or Firm* — Snyder, Clark, Lesch & Chung, LLP

(57) ABSTRACT

A communication terminal comprising: a communication part, a display portion, comprising one of an AMOLED type comprising a white pixel or pixels arranged in RGBW (Red/Green/Blue/White) pattern and having a number of light emitting devices; at least one of the light emitting devices being configured to have a first state and a second operational state, wherein in said first operational state said light emitting device emits light and in a said second operational state said light emitting device is transparent, an image capturing sensor arranged behind said display and aligned with the light emitting device and configured to continuously capture images and generate signals corresponding to said captured image, and a processing unit to receive the signals from the image capturing sensor and process said signals and produce an image comprising images captured by selecting between images captured during said first state.

9 Claims, 4 Drawing Sheets

SCREEN CAMERA

CROSS-REFERENCE TO RELATED APPLICATIONS

This application claims priority under 35 U.S.C. §119, based on U.S. Provisional Patent Application No. 61/638,621 filed on Apr. 26, 2012 and European Patent Application No. 12165700.1 filed on Apr. 26, 2012, the disclosures of which are both hereby incorporated herein by reference.

TECHNICAL FIELD

The invention relates to communication terminals in general and communication terminals provided with a camera behind the display of the terminal in particular.

BACKGROUND

Many mobile phones, PDAs, computers (laptop, monitor) etc., are equipped with a camera in front of the device, usually intended for video calls, in which the image of the user is transmitted to a receiving party.

The camera is usually placed on a top or bottom portion of the phone house or upper edge of the computer display and may define the size/length of this part of the device. Thus, when the user makes a video call, the user does not look the other party in the eye as his/her focus is on the screen looking at the other party.

This makes the video calls less attractive and may annoy the user when he/she changes focus between the camera and screen content.

SUMMARY

The present invention provides a novel way of placing an image recording camera which overcomes the above mentioned problems and also may allow saving space in the housing of the device, e.g., by allowing shorter top or bottom part of the device.

At least for these reasons, a communication terminal is provided comprising a communication part, an image capturing sensor and a display. The image capturing sensor is arranged behind the display, the display comprises a number of light emitting devices, at least one of which has a first state in which the light emitting device is transparent allowing light to pass through the light emitting device and be captured by the image capturing sensor and a second state in which the light emitting device emits light. The terminal further comprises processing means configured to process the images captured by the senor and produce an image comprising images captured during the first state. The image capturing sensor is arranged in the terminal in a position, which corresponds to a position of image of a face of a conferencing party. In one embodiment, the display is active-matrix organic light-emitting diode, AMOLED, type comprising a white pixel corresponding to the light emitting device. The pixels in the display are arranged in RGBW (Red/Green/Blue/White) pattern. In another embodiment, the display is in transparent organic light emitting diode, OLED, technology. The communication device may further comprise a controlling arrangement for synchronizing between transparent state of the light emitting device and image capturing state of the sensor. The communication device may be one of radiotelephone, a personal communications system (PCS) terminal, a personal digital assistant (PDA), a computer, a camera having communication ability, and any other computation or communication device capable of transceiving radio signals.

The invention also relates to a method of enhancing a video communication experience using a communication device, which comprises a communication part, an image capturing sensor and a display. The image capturing sensor is arranged behind the display, the display comprising a number of light emitting devices, at least one of which has a first state in which the light emitting device is transparent allowing light to pass through the light emitting device and be captured by the image capturing sensor and a second state in which the light emitting device emits light. The method comprises processing the images captured by the sensor and producing an image comprising images captured during the first state. In one embodiment, the method comprises continuously capturing images and selecting between images captured during the first state. According to another embodiment, the method comprises capturing images only during the first state.

BRIEF DESCRIPTION OF THE DRAWINGS

Reference is made to the attached drawings, wherein elements having the same reference number designation may represent like elements throughout.

DETAILED DESCRIPTION

According to the invention, at least one camera is arranged behind the display of the device, preferably in a position that corresponds to a point close to the eyes of the communicating party on the screen.

The following detailed description refers to the accompanying drawings. The same reference numbers in different drawings may identify the same or similar elements.

The term "image," as used herein, may refer to a digital or an analog representation of visual information (e.g., a picture, a video, a photograph, animations, etc.).

The term "audio" as used herein, may include may refer to a digital or an analog representation of audio information (e.g., a recorded voice, a song, an audio book, etc.).

Also, the following detailed description does not limit the invention. Instead, the scope of the invention is defined by the appended claims and equivalents. In the following, the invention is described with reference to an example mobile communication terminal, i.e. mobile phone.

Figure 1:
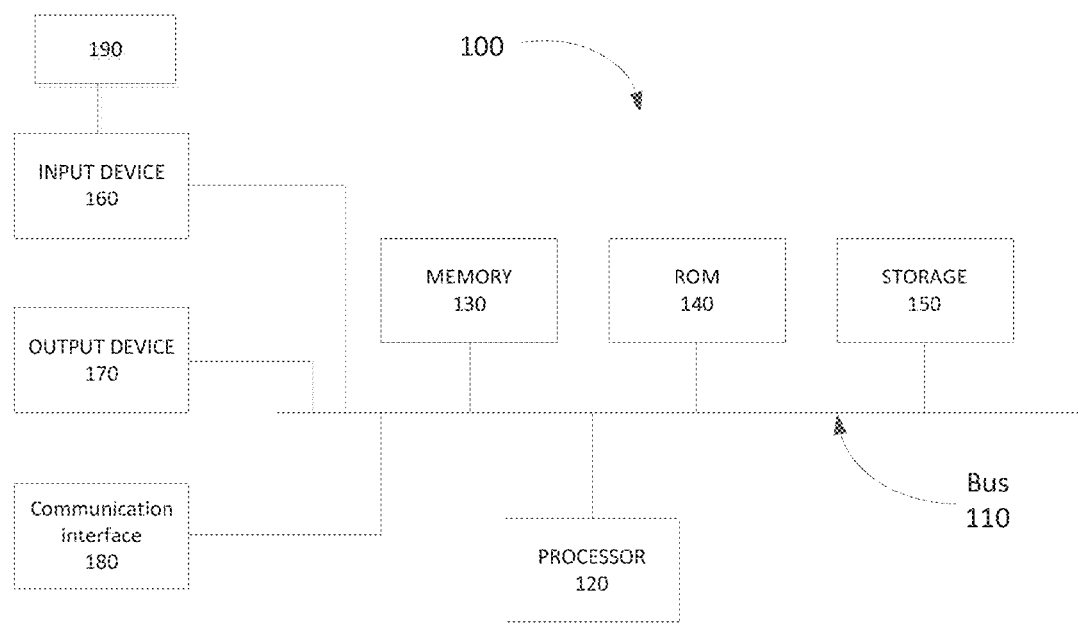
FIG. 1 is a diagram of an exemplary system in which methods and systems described herein may be implemented.

FIG. 1 is a diagram of an exemplary system 100 in which methods and systems described herein may be implemented. System 100 may include a bus 110, a processor 120, a memory 130, a read only memory (ROM) 140, a storage device 150, an input device 160, an output device 170, and a communication interface 180. Bus 110 permits communication among the components of system 100. System 100 may also include one or more power supplies (not shown). One skilled in the art would recognize that system 100 may be configured in a number of other ways and may include other or different elements.

Processor 120 may include any type of processor or microprocessor that interprets and executes instructions. Processor 120 may also include logic that is able to decode media files, such as audio files, video files, multimedia files, image files, video games, etc., and generate output to, for example, a speaker, a display, etc. Memory 130 may include a random access memory (RAM) or another dynamic storage device that stores information and instructions for execution by processor 120. Memory 130 may also be used to store temporary variables or other intermediate information during execution of instructions by processor 120.

ROM 140 may include a conventional ROM device and/or another static storage device that stores static information and instructions for processor 120. Storage device 150 may include any type of devices for storing information and instructions, such a flash memory, for storing information and instructions.

Input device 160 may include one or more conventional mechanisms that permit a user to input information to the system 100, such as a keyboard, a keypad, a directional pad, a mouse, a pen, voice recognition, a touch-screen and/or biometric mechanisms, etc. According to the invention, the input device includes at least one camera 190 for recording visual information.

Output device 170 may include one or more conventional mechanisms that output information to the user, including a display, a printer, one or more speakers, etc. Communication interface 180 may include any transceiver-like mechanism that enables system 100 to communicate with other devices and/or systems. For example, communication interface 180 may include a modem or an Ethernet interface to a LAN. Alternatively, or additionally, communication interface 180 may include other mechanisms for communicating via a network, such as a wireless network. For example, communication interface may include a radio frequency (RF) transmitter and receiver and one or more antennas for transmitting and receiving RF data.

System 100, consistent with the invention, provides a platform through which a user may communicate using video call. System 100 may also display information associated with the video call, i.e., the communicating parties.

According to an exemplary implementation, system 100 may perform various processes in response to processor 120 executing sequences of instructions contained in memory 130. Such instructions may be read into memory 130 from another computer-readable medium, such as storage device 150, or from a separate device via communication interface 180. It should be understood that a computer-readable medium may include one or more memory devices or carrier waves. Execution of the sequences of instructions contained in memory 130 causes processor 120 to perform the acts that will be described hereafter. In alternative embodiments, hardwired circuitry may be used in place of or in combination with software instructions to implement aspects consistent with the invention. Thus, the invention is not limited to any specific combination of hardware circuitry and software.

Figure 2:
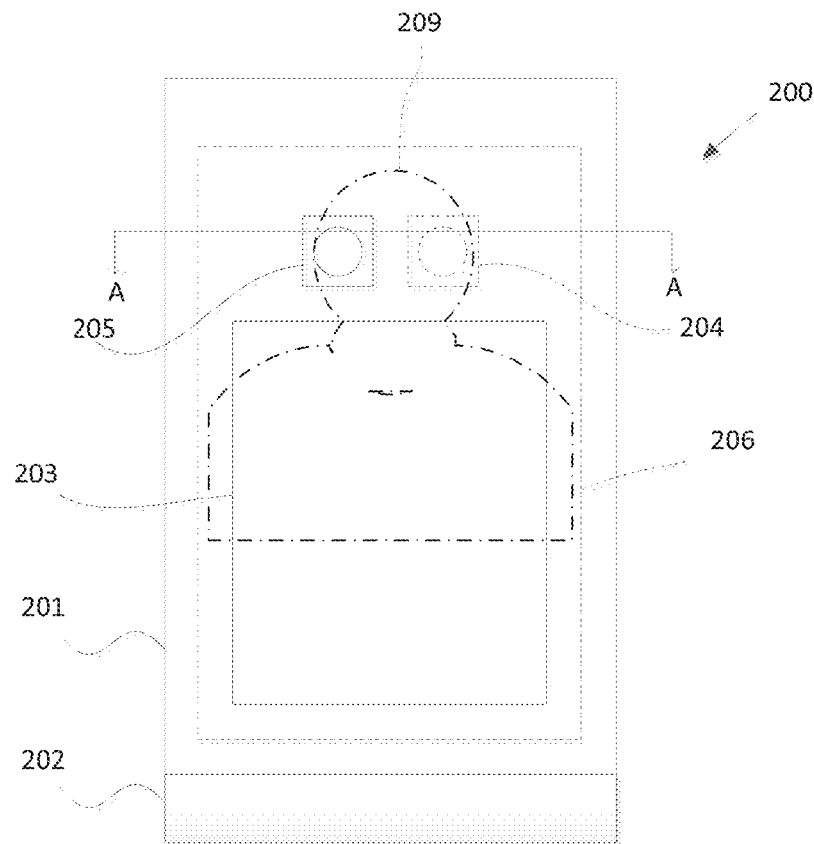
FIG. 2 illustrates a schematic frontal view a communication terminal according to one embodiment of the invention.

FIG. 2 illustrates schematics of a terminal 200, such as a mobile phone, comprising a housing 201, antenna 202, power source 203 and two cameras 204 and 205. The display portion 206 is indicated with dashed line. One of the cameras, e.g., 205 is the main camera and the other one, e.g., 204 is so called chat camera. The cameras are arranged further distanced from the top portion of the terminal and evidently below behind the display 206. For example, at least one of the cameras is arranged in a position, which may correspond to face of a conferencing party, especially substantially in eye height of the image 209.

Figure 3:
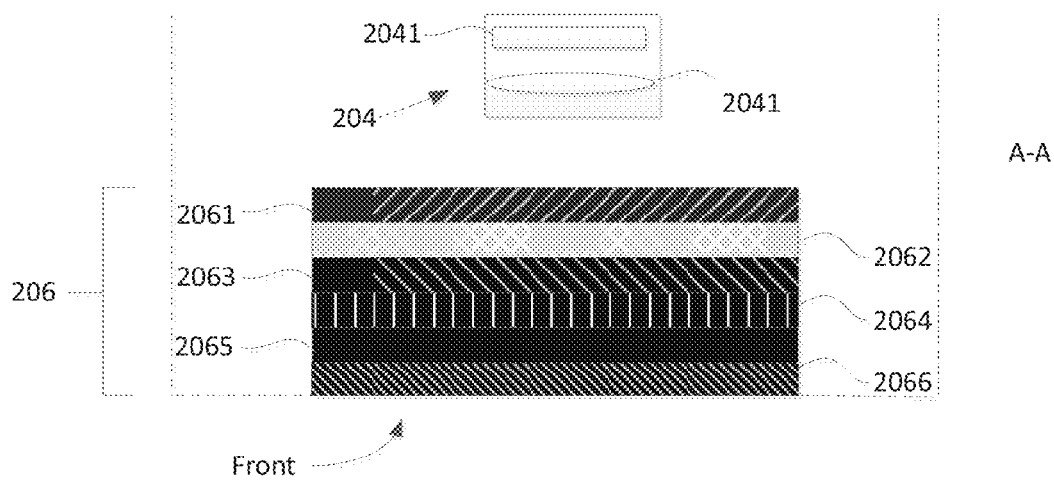
FIG. 3 is a schematic illustration of a cut through the terminal of FIG. 2.

The example illustrated schematically in FIG. 3 is a cut through the terminal of FIG. 2, e.g., along the line A-A, showing camera 204 and portion of display 206. The camera 204 comprises an image sensor 2041 (such as CCD or CMOS sensor) and a lens 2042. The display 206 comprises a transparent substrate 2061, one or more organic layer 2063, a transparent cathode layer 2064, optionally a touch layer 2065 (which may comprise a package with many transparent function layers) and a transparent cover 2066. In an active matrix array, the display may also comprise a TFT array 2062 and organic active layers.

In one example, the display comprises of AMOLED (active-matrix organic light-emitting diode) type, in which pixels are arranged in RGBW (Red/Green/Blue/White) pattern in layer 2063, for example described in US 2011285881 by SONY Corp., compared to the traditional RGBG AMOLED. This technology includes additional white pixels. The white pixels switch between on and off state, whereby in the on state the diode emits (white) light and in the off state the diode is transparent.

Even transparent OLED (organic light emitting diode) technology can be used in pixel level. Transparent OLEDs have only transparent components (substrate, organic layer or layers, cathode and anode) and, when turned off, are transparent in high degree. When a transparent OLED display is turned on, it allows light to pass in both directions. A transparent OLED display can be either active- or passive-matrix.

Also AMOLED displays where all sub pixels are transparent to a high degree in off state may also be used.

Figure 4:
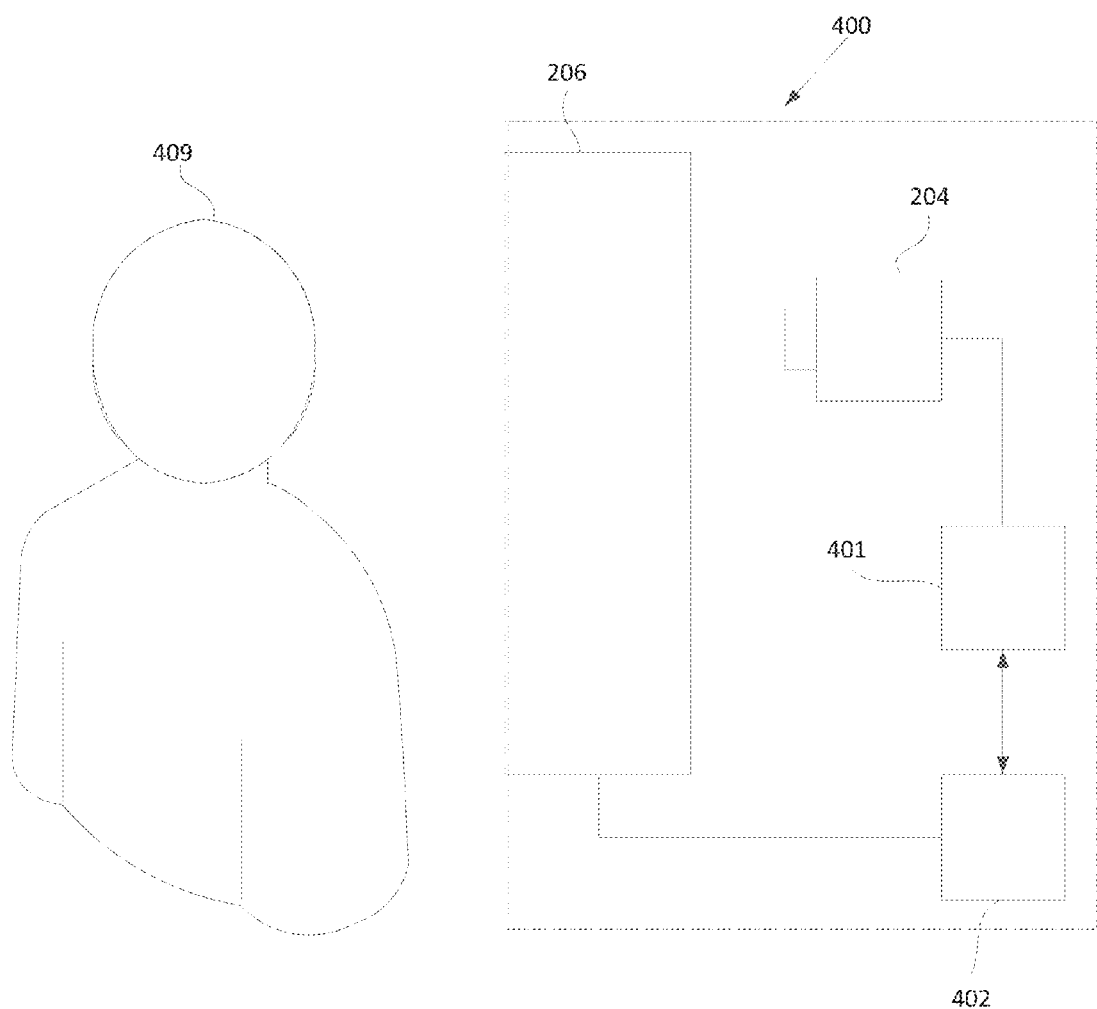
FIG. 4 illustrates an exemplary system according to one embodiment of the invention.

FIG. 4 illustrates a block diagram of an exemplary combined camera and display system 400, according to one embodiment of the present invention. An image (not shown), e.g., of a person in the video conference, is displayed on the flat-panel screen 206. The flat panel screen 206 may display the picture by adjusting the optical transparency of its individual pixels. The camera 204 and the screen 206 are each controlled by a corresponding driver 401 and 402, respectively (or a combined driver). The display driver 402 controls the anodes and cathodes of the display to emit light at pixels to produce the image seen by a user 409. The camera 204 captures an image of the user 409 and his/her surroundings through screen 206. To be able to capture an image of the user while an image is displayed, the camera must be synchronized with pixels such that the image or a portion of the image of the user 409 is acquired when one or several pixels are transparent. It is appreciated that the items illustrated in FIG. 4 are highly exaggerated. Assuming that a pixel on the screen may be less than 2 μm, the camera may be a single pixel camera with same size as one pixel, cover a number of pixels in one area or use an algorithm to assemble an image from a number of scattered pixels covering the camera pixels.

To be able to record an image with the camera, several technologies may be used. The drivers 401 and 402 may be synchronised, e.g., by driver 402 informing driver 401 when one or several pixels in the camera view is/are transparent so that the camera can capture images. Then the image or image parts captured during transparency of the pixels are assembled to an image and transmitted to the receiver.

According to another embodiment, the sweep of control signal over the screen for activating pixels is synchronized with the sweep of capturing image over the camera sensor and the resultant output from camera is processed to generate image frames.

The driver, synchronization and processing of the image data may be carried out in one or several of input device 160, output device 170 and/or processor 120 of the system of FIG. 1.

Figure 5:
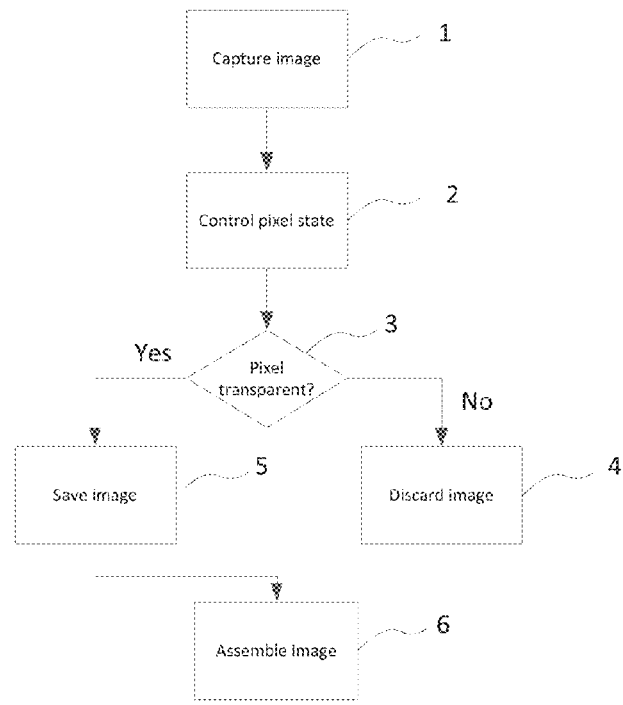
FIG. 5 illustrates exemplary steps of a method according to the invention.

Thus, according to one exemplary method of the invention as illustrated in FIG. 5, images may be captured continuously (1), state (on or off state) of the pixel(s) in front of the camera is controlled (2), if the pixel(s) is not transparent (on or off state) for a specific image frame (3), the image is discarded (4). If the pixel(s) is transparent, the image is saved (5). The saved images are assembled to one image, which can be transmitted to the receiver.

Figure 6:
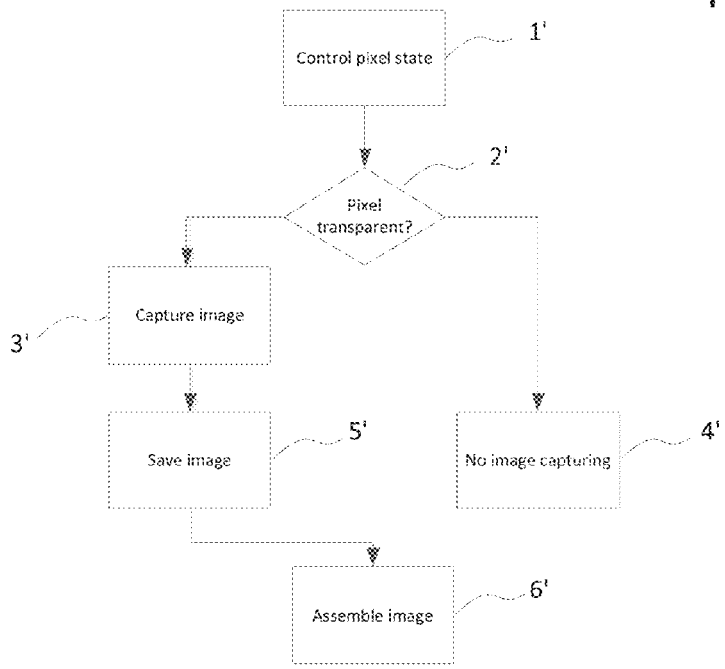
FIG. 6 illustrates exemplary steps of another method according to the invention.

In another example, as illustrated in FIG. 6, the method comprises, controlling (1') the state (on or off state) of the pixel(s) in front of the camera. If (2') the pixel(s) is not transparent no image is captured (4'). If (2') the pixel(s) is transparent image is captured (3') and saved (5') and the saved images are assembled (6') to one image which can be transmitted to the receiver.

The step of saving and transmitting may be combined so that the images are transmitted after capturing.

Of course, other techniques for synchronising capturing image while a pixel is transparent may be used. Preferably, the repetitive sequence of displaying image on the screen and capturing image by the camera behind the screen is at a frame rate greater than the flicker fusion frequency for the human eye (180 Hz).

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

A "device" as the term is used herein, is to be broadly interpreted to include a radiotelephone having ability for Internet/intranet access, web browser, organizer, calendar, a camera (e.g., video and/or still image camera), a sound recorder (e.g., a microphone); a personal communications system (PCS) terminal that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc.

The above mentioned and described embodiments are only given as examples and should not be limiting to the present invention. Other solutions, uses, objectives, and functions within the scope of the invention as claimed in the below described patent claims should be apparent for the person skilled in the art.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

I claim:

1. A communication terminal comprising:
   a communication part;
   a display, comprising one of an active-matrix organic light-emitting diode, AMOLED, type comprising a white pixel or having pixels arranged in RGBW (Red/Green/Blue/White) pattern and having a number of light emitting devices,
   wherein at least one of said light emitting devices is configured to have a first operational state and a second operational state, wherein in said first operational state at least one of said light emitting devices emits light, and wherein in said second operational state at least one of said light emitting devices is transparent;
   an image capturing sensor, arranged behind said display and aligned with at least one of said light emitting devices having the first and the second operational states, said image capturing sensor being configured to continuously capture images and generate signals corresponding to said captured images; and
   a processing unit configured to receive the signals from the image capturing sensor and process said signals from said image capturing sensor, and produce an image by selecting images captured during said second operational state, and discarding images captured during said first operational state.

2. The communication terminal of claim 1, wherein said image capturing sensor and at least one of said light emitting devices are arranged in a position, which corresponds to a position of an image of a face of a conferencing party.

3. The communication terminal of claim 1, wherein said display comprises a transparent organic light emitting diode, OLED.

4. The communication terminal of claim 1, further comprising a controlling arrangement for synchronizing between the transparent state of at least one of said light emitting device and an image capturing state of said sensor.

5. The communication terminal of claim 1, being one of a radiotelephone, a personal communications system (PCS) terminal, a personal digital assistant (PDA), a computer, a camera having communication ability, and any other computation or communication device capable of transceiving radio signals.

6. A method, comprising:
capturing image data by a sensor positioned behind a portion of a display, wherein the portion of the display includes light emitting devices configured to have a first operational state wherein the light emitting devices emit light, and a second operational state wherein the light emitting devices are transparent;
receiving the image data during the first operational state and the second operational state;
determining the operational state of the light emitting devices;
discarding the image data based upon determining that the light emitting devices are in the first operational state; and
saving the image data based upon determining that the light emitting devices are in the second operational state.

7. The method of claim 6, wherein the image data is captured in parts corresponding to at least one light emitting device in the portion of the display, and further comprises:
assembling the parts of the image data.

8. The method of claim 7, wherein assembling the parts of the image data further comprises:
combining image data corresponding to scattered light emitting devices within the portion of the display.

9. The method of claim 6, further comprising:
receiving a control signal corresponding to a sweep activating light emitting devices over the display; and
capturing the image data in accordance with the received control signal.

* * * * *